(12) United States Patent
Parkinson et al.

(10) Patent No.: US 6,290,258 B1
(45) Date of Patent: Sep. 18, 2001

(54) COLLAPSIBLE STEERING COLUMN ASSEMBLY FOR A VEHICLE

(75) Inventors: Steven Parkinson, Lakeville, IN (US); Nicholas Henry, Northants (GB)

(73) Assignee: Nastech Europe Limited, Coventry (GB)

( * ) Notice: Subject to any disclaimer, the term of this patent is extended or adjusted under 35 U.S.C. 154(b) by 0 days.

(21) Appl. No.: 09/579,434

(22) Filed: May 26, 2000

(30) Foreign Application Priority Data

May 19, 1999 (GB) ................................................ 99123481

(51) Int. Cl.$^7$ ........................................................ B62D 1/18
(52) U.S. Cl. ............................ 280/775; 74/493; 280/777
(58) Field of Search ................................... 280/775, 777, 280/779; 74/496, 493, 495, 498

(56) References Cited

U.S. PATENT DOCUMENTS

| | | | |
|---|---|---|---|
| 5,188,392 | 2/1993 | Sugiki et al. ........................ | 280/775 |
| 5,609,365 | 3/1997 | Holka ................................... | 280/777 |
| 5,690,362 | 11/1997 | Peitsmeier et al. .................. | 280/775 |
| 5,941,130 * | 8/1999 | Olgren et al. ......................... | 74/493 |

* cited by examiner

Primary Examiner—Eric Culbreth
(74) Attorney, Agent, or Firm—Miles & Stockbridge P.C.

(57) ABSTRACT

A clamping mechanism for an adjustable steering column for a vehicle has an actuator coupled to a clamp for clamping the steering column in a desired position. The actuator is controlled to adjust clamping force of the clamp in the event of vehicle crash to thereby control energy absorption, and the actuator can be electrically controlled. Sensors are used to calculate weight, posture, position, etc. of the driver and thereby predetermine the settings required for energy absorption to protect the driver. The actuator depends on the sensed settings to control the clamping absorption energy.

5 Claims, 1 Drawing Sheet

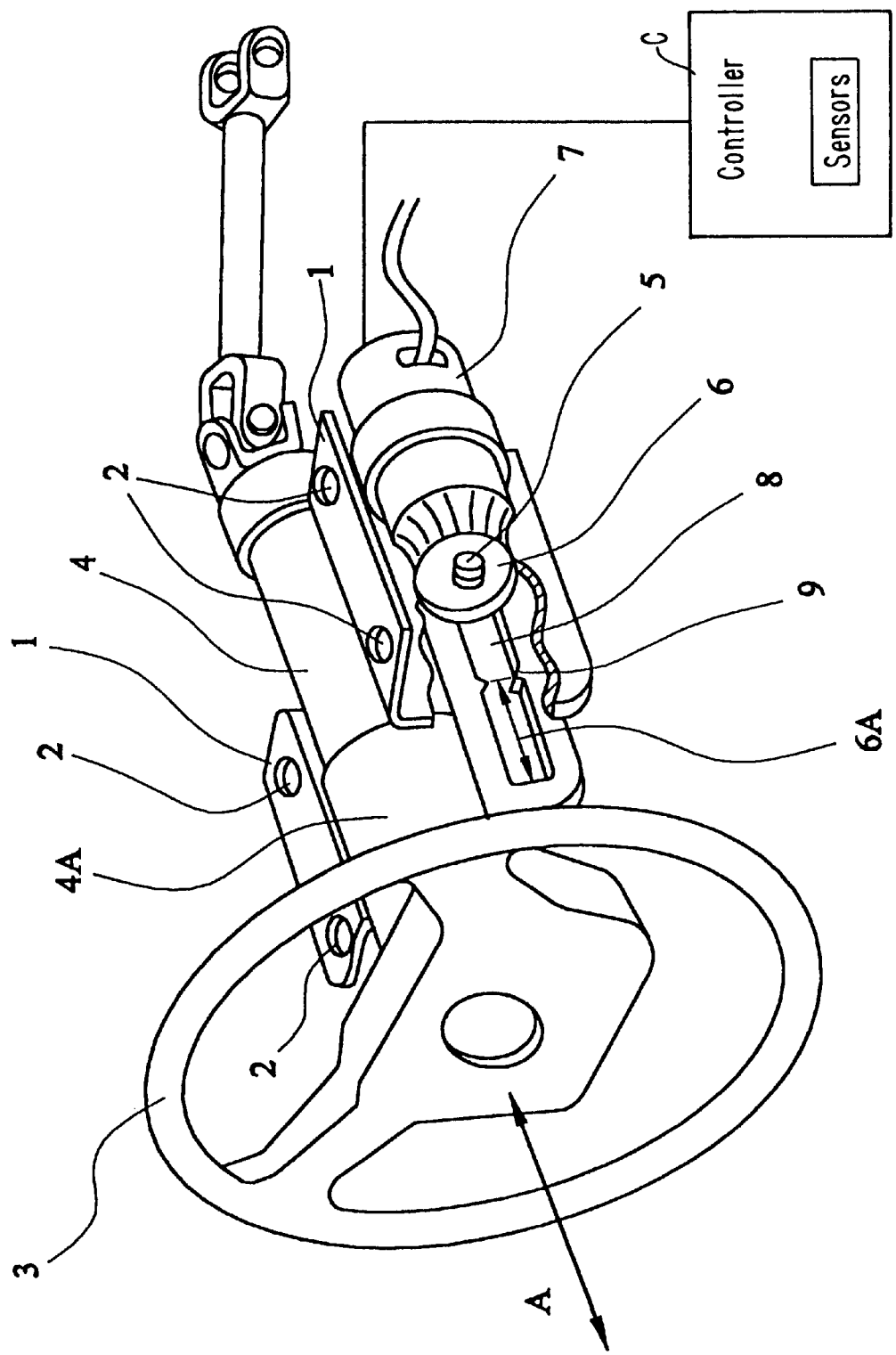

COLLAPSIBLE STEERING COLUMN ASSEMBLY FOR A VEHICLE

BACKGROUND OF THE INVENTION

This invention relates to a collapsible steering column assembly for a vehicle.

Developments are now progressing towards "smart" steering columns, and this invention has for its purpose to provide a steering column which can be collapsed in the event of a vehicle crash in a way that takes into account various physical characteristics of the driver, such as weight, posture, position and dimensions.

A clamping mechanism for an adjustable steering column for a vehicle is known which comprises an actuator coupled to a rack and pinion or other geared arrangement of a clamping device for clamping the steering column in a desired position, the actuator being electrically powered either by a motor or a solenoid.

SUMMARY OF THE INVENTION

An object of the present invention is to provide a smart version of such a mechanism.

According to the present invention, there is provided a clamping mechanism for an adjustable steering column for a vehicle, comprising an actuator coupled to a clamp to clamp the steering column in a desired position, there being control means for the actuator to adjust the clamping force of the clamp on the steering column in the event of vehicle crash, thereby to control energy absorption at the steering column assembly during collapse.

The actuator can be electrically controlled. The clamping mechanism can incorporate a geared arrangement as discussed above.

BRIEF DESCRIPTION OF THE DRAWING

The drawing shows a perspective view of a clamping mechanism for an adjustable steering column for a vehicle as an example according to the present invention.

DETAILED DESCRIPTION OF THE PREFERRED EMBODIMENTS

For a better understanding of the invention and to show how the same may be carried into effect, reference will now be made, by way of example, to the accompanying drawing, in which the single figure is a diagrammatic perspective view of a collapsible steering column assembly for a vehicle, the steering column assembly incorporating a clamping mechanism.

The drawing shows a steering column assembly restrained through a mounting bracket 1 at mounting points 2 to another part of the vehicle. A steering wheel 3 is mounted on a steering column assembly 4 and, in the form illustrated, the steering column 4 is both rake and reach adjustable. In other words, the steering wheel can be moved in and out in the direction of the double arrow A and/or up and down to satisfy driver comfort preference.

In the event of vehicle crash, the steering wheel 3 and outer assembly 4A are required to collapse under controlled conditions in order to minimize injury to the driver.

For usual everyday adjustment of the steering column, the steering wheel 3 and assembly part 4A are secured by a clamping mechanism using friction against axial movement. This frictional clamping is provided in the example illustrated by a clamp bolt 5 which is mounted through the steering column assembly 4 at 90 degrees to the axis of the steering column. When a signal is received, via a manual switch used by the driver of the vehicle, an electric motor driven threaded drum 6, the electric motor being shown at 7, is screwed on to the bolt 5, thereby taking up all free play and clamping the assembly 4 with a given force. The clamp force can be switched on and off to permit adjustment of the assembly.

On entry to the vehicle, the occupant assumes a driving position and a controller cuses various sensors (shematically shown) calculate weight, posture, position, etc. and thereby predetermine the settings required for energy absorption with a view to protecting the driver. In response to signals from these safety sensors, the electric clamping motor 7 is operated to increase/decrease torque on the clamping bolt 5, thereby increasing/decreasing the amount of available energy absorption through friction at the clamping mechanism 6.

In the form illustrated, linear slots 8, one on either side of the steering column assembly 4, that are normally provided to allow for reach adjustment of the steering column, are each extended by a length 6A to provide a so-called "crash ride down length". The normal non-crash, adjustment range is limited within deformable boundaries 9 which can be in the form of an over-ride, a break-away component or other means. The slots 8 can be curved to provide a desired attitude of steering wheel 3 to the driver as travel progresses along the slots.

When the system is active, the data can be updated every few seconds, e.g. by movement of the driver, which will result in a different posture, position, etc. so that the updated data is taken into account on an almost continual basis.

What is claimed:

1. A clamping mechanism for an adjustable steering column for a vehicle, comprising an actuator and a clamp, the actuator being coupled to the clamp to clamp the steering column in a desired position, there being a controller for the actuator to adjust a clamping force of the clamp on the steering column in the event of vehicle crash, thereby to control energy absorption at the steering column during collapse.

2. A clamping mechanism according to claim 1, wherein the mechanism is electrically controlled.

3. A clamping mechanism according to claim 1, wherein the clamp has a clamping bolt and wherein the controller includes sensors for predetermining settings required dependent upon occupant criteria in a driving position for a vehicle, thereby to increase and decrease torque on the clamping bolt of the clamp, thereby to increase and decrease respectively the amount of available energy absorption through friction of the clamping mechanism.

4. A clamping mechanism according to claim 1, wherein the mechanism includes a normal non-crash adjustment range limited within deformable boundaries to allow for normal adjustment of the steering column.

5. A vehicle incorporating a clamping mechanism for an adjustable steering column for a vehicle, comprising an actuator and a clamp, the actuator being coupled to the clamp to clamp the steering column in a desired position, there being a controller for the actuator to adjust a clamping force of the clamp on the steering column in the event of vehicle crash, thereby to control energy absorption at the steering column during collapse.

* * * * *

UNITED STATES PATENT AND TRADEMARK OFFICE
CERTIFICATE OF CORRECTION

PATENT NO. : 6,290,258 B1
DATED : September 18, 2001
INVENTOR(S) : Steven Parkinson and Nicholas Henry It is certified that error appears in the above-identified patent and that said Letters Patent is hereby corrected as shown below:

<u>Title page,</u>
Item [30] Foreign Application Priority Data, should read
-- May 26, 1999 (GB)..............................9912348.1 --.

Signed and Sealed this

Second Day of April, 2002

Attest:

JAMES E. ROGAN
*Attesting Officer*   *Director of the United States Patent and Trademark Office*